US010480543B2

United States Patent
Ottliczky et al.

(10) Patent No.: US 10,480,543 B2
(45) Date of Patent: Nov. 19, 2019

(54) VALVE ASSEMBLY

(71) Applicant: BUERKERT WERKE GMBH & CO. KG, Ingelfingen (DE)

(72) Inventors: Martin Ottliczky, Forchtenberg (DE); Harry Stoesser, Mueglitztal (DE); Heiko Engler, Forchtenberg (DE)

(73) Assignee: BUERKERT WERKE GMBH & CO. KG., Ingelfingen (DE)

( * ) Notice: Subject to any disclaimer, the term of this patent is extended or adjusted under 35 U.S.C. 154(b) by 194 days.

(21) Appl. No.: 15/788,864

(22) Filed: Oct. 20, 2017

(65) Prior Publication Data

US 2018/0112688 A1   Apr. 26, 2018

(30) Foreign Application Priority Data

Oct. 20, 2016 (DE) .................. 10 2016 120 029

(51) Int. Cl.
*F15B 13/08* (2006.01)
*F16K 27/00* (2006.01)

(52) U.S. Cl.
CPC ...... *F15B 13/0814* (2013.01); *F15B 13/0871* (2013.01); *F15B 13/0896* (2013.01); *F16K 27/003* (2013.01); *F15B 13/0839* (2013.01); *Y10T 137/87885* (2015.04)

(58) Field of Classification Search
None
See application file for complete search history.

(56) References Cited

U.S. PATENT DOCUMENTS

| 4,815,496 A | * | 3/1989 | Nishitani | ............ F15B 13/0814 |
| | | | | 137/271 |
| 5,490,385 A | * | 2/1996 | Stoll | .................. F15B 13/0814 |
| | | | | 137/596.17 |
| 5,765,589 A | * | 6/1998 | Stoll | .................. F15B 13/0814 |
| | | | | 137/271 |
| 6,173,731 B1 | * | 1/2001 | Ottliczky | ............ F15B 13/0817 |
| | | | | 137/271 |

(Continued)

FOREIGN PATENT DOCUMENTS

| DE | 4143274 A1 | 8/1993 |
| DE | 29810091 U1 | 12/1998 |

(Continued)

*Primary Examiner* — John Fox
(74) *Attorney, Agent, or Firm* — McNees Wallace & Nurick LLC

(57) ABSTRACT

A valve assembly has a basic module and a plurality of valve modules which are mounted on the basic module side by side along a line-up direction. The basic module is composed of a first and a second leg which extend at an angle with respect to each other such that the two legs delimit a receiving space for the valve modules on two sides, a fluid area being provided on the first leg which has a fluid connection face formed on an inside of the first leg which is turned towards the second leg and on which fluid connections are provided which communicate with fluid connections of the valve modules. All fluid connections of the valve modules communicate with fluid connections of the fluid connection face. An electrical area in which electrical connections communicating with electrical connections of the valve modules are provided is provided on the second leg.

22 Claims, 6 Drawing Sheets

(56) References Cited

U.S. PATENT DOCUMENTS

| | | | | |
|---|---|---|---|---|
| 2002/0013077 A1* | 1/2002 | Lepine | ............... | F15B 13/0814 |
| | | | | 439/191 |
| 2007/0278436 A1* | 12/2007 | Phillips | ............... | F15B 13/0814 |
| | | | | 251/129.03 |
| 2008/0203339 A1* | 8/2008 | Kato | ................... | F16K 31/061 |
| | | | | 251/65 |

FOREIGN PATENT DOCUMENTS

| DE | 10203792 A1 | 8/2003 |
|---|---|---|
| GB | 2263154 A | 7/1993 |

\* cited by examiner

VALVE ASSEMBLY

The invention relates to a valve assembly having a basic module and a plurality of valve modules which are mounted on the basic module side by side along a line-up direction Valve assemblies of this type, also referred to as valve islands, can be used to control complex pneumatic systems, for example. The basic module serves as a central supply module for electrical and fluidic energy by taking over the central supply with a control fluid (pneumatic or hydraulic fluid). In some applications, a central supply with process or rinsing fluids, for example, may also be desired. The use of a basic module permits in a simple manner a modular arrangement of different valve modules.

The object of the invention is to create a compact valve assembly which can be supplied with electrical energy and the required control and/or process fluids with as little efforts as possible, an exchange of individual valve modules being possible in a simple manner.

This object is achieved with a valve assembly having the features of claim 1. The valve assembly has a basic module and a plurality of valve modules which are mounted on the basic module side by side along a line-up direction. The basic module comprises a first and a second leg which extend at an angle with respect to each other such that the two legs delimit a receiving space for the valve modules on two sides. A fluid area is provided on the first leg, which has a fluid connection face formed on an inside of the first leg which is turned towards the second leg and on which fluid connections are provided which communicate with fluid connections of the valve modules. All fluid connections of the valve modules communicate with fluid connections of the fluid connection face. An electrical area is provided on the second leg, in which electrical connections are provided which communicate with electrical connections of the valve modules. According to the invention, the entire supply of all valve modules with fluid, in particular with inlet air, exhaust air and control air, is preferably realized exclusively via the basic module. It is therefore not necessary to couple hoses or pipes to individual valve modules. This simplifies the exchange of individual valve modules of the valve assembly and the arrangement of the pipes to the valve assembly. As all fluid connections of the valve assembly are provided on the first leg and all electrical connections (current supplies and electronic connections) are provided on the second leg, an ordered and clear interconnection is possible in a simple manner.

The line-up direction preferably extends parallel to the surface of both legs in order to optimally use the space given by the basic module.

The electrical area preferably comprises an electrical connection face which is formed on an inside of the second leg which is turned towards the first leg and in which the electrical connections are arranged.

The basic module offers for each valve module a fluid interface which in most cases can comprise a plurality of fluid connections for fluids providing driving energy (compressed air or hydraulic liquid, for example) and/or work fluids such as process fluids and rinsing fluids. The fluid supply with all fluids flowing through the respective valve module is thus ensured via the fluid interface of the basic module. An electrical interface is furthermore provided on the basic module for each of the valve modules for the current supply and, if necessary, also for the transmission of measured values or of control commands and generally for the communication with an external control unit.

The fluid connections of the respective fluid interface for an individual valve module are preferably arranged in a sectional plane perpendicularly to the line-up direction. Preferably, the electrical connection is also arranged in this sectional plane. The fluid connections and the electrical connection define a plug-in location for the respective valve module.

Normally, the electrical connection forms an electrical interface in which connections for the electrical voltage supply and the transmission of data are provided in close spatial vicinity to each other and which can advantageously be contacted via an appropriate complementary interface on the valve module by a simple putting-on.

The electrical connection face in particular forms a surface on the side of the second leg which is turned towards the first leg and in which a series of openings are formed in the line-up direction. The individual electrical connections are each located in the region of one of the openings and are for example formed by plug sockets inserted into the openings or by electrical contacts via which the openings are accessible.

This configuration permits to configure the individual valve modules in a substantially cuboid manner, the narrowest side being located along the line-up direction to be able to mount as much valve modules as possible side by side on the basic module. The surface of the valve modules perpendicularly to the line-up direction, as far as possible, is configured approximately square such that the entire valve assembly can effectively use the available space in a switch cabinet, for example.

At least one actuator fluid connection for an external actuator is in particular provided on the basic module, a supply of the actuator with fluid being entirely controlled via one of the valve modules, and the actuator fluid connection associated with the external actuator in the basic module communicating with a fluid connection in the fluid connection face, which in turn communicates with a fluid connection of the valve module concerned. External actuators may be pneumatic cylinders or pneumatically driven valves, so-called process valves, for example. The fluid connection associated with the respective external actuator in the fluid connection face is preferably part of the fluid connection interface for the respective valve module. Fluid flowing to or from the external actuator thus in principle also flows through the valve module and through the basic module. No additional fluid connections on the valve module which are arranged outside the fluid interface are necessary.

All fluid connections of the valve module are advantageously located directly on the fluid connections of the fluid interface in the fluid connection face such that all fluid connections of the valve module can be coupled by simply plugging the valve module onto the basic module and can be detached.

The at least one actuator fluid connection preferably opens into a bottom surface of the basic module which is formed on the first leg on the side opposite the fluid connection face. The bottom surface is advantageously parallel to the fluid connection face.

The two legs may generally be arranged at an angle of 90° with respect to each other.

Further connections for the coupling to general fluid supply and fluid discharge pipes for example, may also be provided in the bottom surface, which can generally apply to all fluids used in the valve assembly.

The fluid connection associated with the external actuator preferably directly communicates with the actuator fluid connection via a branch duct in the first leg of the basic module. The actuator can communicate with the actuator fluid connection directly or via a fluid feeding pipe.

This arrangement permits the unproblematic coupling of external actuators to the bottom surface of the basic module. As a standard, further fluid connections are also arranged on this bottom surface, the main feeding and discharge pipes for the control fluids and/or process fluids for example, such that the bottom surface is usually freely accessible.

The space in the region of the receiving space for the valve modules thus entirely remains reserved for the valve modules and possibly further functional modules, as described further below, and need not be occupied by hose couplings to further components. This also improves the accessibility of the valve modules themselves, for example for the exchange and maintenance.

Fluid supply ducts which preferably extend parallel to each other along the line-up direction and which guide fluid through the basic module are formed in the first leg in the fluid area. In particular, at least one compressed-air supply duct, at least one, preferably two exhaust-air ducts, at least one control compressed-air duct and/or at least one control exhaust-air duct may be provided. Furthermore, a plurality of work fluid ducts could for example be provided as feeding duct and as discharge duct for different process and rinsing liquids. Using such an arrangement of fluid supply ducts in the basic module, it is possible in a simple manner to supply any of the fluid interfaces for the individual valve modules with all required fluids, a fluid discharge through the basic module being simultaneously given. As all fluid ducts are provided in the first leg, the guiding of the fluid in the basic module is limited to the first leg, and there is a spatial separation between fluid-carrying areas and current-carrying areas, namely the electrical area in the second leg.

Each fluid connection in the fluid connection face preferably communicates with at least one of the supply ducts or the bottom surface, in particular to an outlet of a fluid connection on the bottom surface, via a branch duct. It is not necessary to provide further types of connections.

Since the external actuators are exclusively supplied and controlled via the valve modules, the actuator fluid connection does usually not directly communicate with one of the supply ducts but exclusively via one of the valve modules.

In order to permit a simple exchange of individual valve modules also during operation, a shutoff or check valve is preferably arranged at least in one of the branch ducts, particularly preferably in each branch duct, and is configured so as to be adapted to be opened by a valve module mounted on the basic module. When a valve module is inserted into the basic module and communicates with the fluid interface, the respective shutoff valve(s) is/are automatically opened by the valve module. Upon removal of the respective valve module, the shutoff valve is then automatically closed again such that no fluid can exit the fluid interface in the basic module during operation. The opening of the shutoff valves can be realized either mechanically, for example by means of a tappet of the shutoff valve which is arranged in the branch duct and which is actuated by the respective fluid connection of the valve module, or electronically via an appropriate interconnection of the shutoff valves with a control unit of the valve assembly.

In the electrical area, the second leg preferably includes an electrical duct in which electrical connecting means extend which in this way can be simply incorporated into the basic module.

The electrical connecting means are preferably formed by a printed circuit board which extends in the line-up direction over the entire length of the electrical area. Electrical lines and data lines separated therefrom may be provided on the printed circuit board. It is also possible to provide electronic components such as a radio module or a control unit on the printed circuit board, which monitor valve modules and/or other functional modules inserted into the basic module and permit a communication therewith. The electrical contacts of the electrical connections may be provided directly on the printed circuit board.

The printed circuit board may also have at least one central electrical interface for the entire valve assembly, for example in the form of a central connector plug. This central connection can be configured in any appropriate way and can in particular be designed for the coupling to a bus system.

Due to the flexibility of the configuration, the entire electrical supply and interconnection of the valve assembly can be realized via the printed circuit board. Further lines, either for the current supply or the communication of data, are not necessary as these functions can be taken over by the central electrical connection.

As already mentioned, further functional modules can be inserted into the basic module in the line-up direction in addition to the valve modules.

The further functional modules for example comprise electronic modules which have electrical connections but no fluid connections. Different types of electronic modules may be provided.

First electronic modules may for example be provided, which are configured as control modules for electrical drives or as diagnostic modules, for example. The first electronic modules are preferably arranged in the line-up direction in a row with the valve modules and adjacent thereto and can also have dimensions which are similar to those of the valve modules.

Alternatively or additionally, second electronic modules may be provided which in particular serve to indicate status messages and/or measured values. In contrast to the first electronic modules, i.e. the feed-in modules and the closure modules which are preferably arranged in a row with the valve modules, the second modules are preferably arranged above (with respect to an orientation of the valve assembly in the mounted state) the valve modules. The second electronic modules preferably extend over several valve modules so as to provide sufficient space for a display, for example. This is possible as the second electronic modules do not require any fluid connections but merely electrical connections. Separate interfaces for the connection of the second electronic modules which are provided in the direction of the free edge of the second leg offset with respect to the electrical interfaces for the valve modules may be purposefully provided in the electrical area such that the second electronic modules can be coupled independently of the valve modules.

Generally, the electronic module can also include purely electrical connections for the coupling to external actuators or individual valve modules via which the valve modules can be piloted and/or read out. Such a coupling can be realized directly from the valve module or the external actuator to the respective electronic module. Alternatively, a coupling of the valve modules to the electronic modules via the electrical interfaces of the valve modules and the electronic modules and, if necessary, via an internal control unit provided on the electrical connecting means, in particular the printed circuit board, is of course also possible.

The further functional modules can furthermore comprise at least one feed-in module which has supply connections for the supply of the basic module with fluidic energy, the supply connections being then adapted to communicate with at least one supply duct of the basic module via at least one fluid connection of the fluid connection face. The feed-in module can for example use fluid interfaces on the fluid connection face.

Furthermore, at least one closure module is for example provided which is arranged on a side of the basic module perpendicularly to the line-up direction and which in particular closes all supply ducts in the basic module in a fluid-tight manner. The manufacture of the basic module is simplified when using in particular two closure modules which are respectively arranged at the lateral ends of the basic module, as the continuous supply ducts in the basic module may be left open laterally. They are each closed in a fluid-tight manner by the closure modules. The dimensions of the closure modules are simultaneously selected so as to correspond to the dimensions of the valve modules transversely to the line-up direction such that the valve assembly assumes a compact shape.

Each of the valve modules preferably comprises an electrically controlled pilot valve and a fluidically controlled main valve. The pilot valve is usually a solenoid valve, whereas the main valve may be a fluid-controlled sliding valve. The pilot valve and the main valve may be arranged one on top of the other as viewed perpendicularly to the line-up direction, which saves space in the line-up direction. In this way, the electrical connections of the pilot valve are furthermore arranged near the electrical connection on the second leg of the basic module associated with the respective plug-in location of the valve module, whereas the fluid connections of the main valve are located directly above fluid connections in the fluid connection face in the first leg of the basic module. Such a shape of the valve modules results in an approximately square shape of the entire valve assembly in a top view along the line-up direction, which permits to make better use of the depth of a switch cabinet in which the valve assembly is to be fitted.

For a simple mounting of the valve modules, a fastening structure having at least one inclined surface and into which the valve modules can be inserted, is preferably formed on the basic module, the inclined surface being oriented so as to exert a clamping force onto the respective valve module which presses the fluid connections of the valve module against the associated fluid connections of the fluid connection face. Upon insertion of a valve module into the basic module onto one of the designated plug-in locations, an exact positioning of the valve module is simultaneously realized in which a sealed fluidic communication with the fluid connections of the fluid interface of the basic module is also already obtained. It is in particular unnecessary to couple individual fluid connections separately. Generally, all fluid connections should already be coupled by the simple insertion of the valve module at the associated plug-in locations by the insertion of the valve module into the basic module and the fastening structure, a fluid tightness with respect to the environment being also realized.

Preferably, the coupling with the electrical connection is also realized by means of a simple plug connection in which the plug or a socket on the valve module is plugged into the respective mating connection in the electrical interface when the valve module is inserted into its plug-in location.

In order to permanently fasten the valve modules to the basic module, preferably fixing elements are provided for the fastening of the valve modules which are for example arranged in the region of a free end of the first leg. The fixing elements can in particular be fastening openings into which a screw can for example engage so as to screw the valve module to the basic module.

Such fastening structures and/or fixing elements can also be provided for further functional modules, in particular for feed-in modules, closure modules and first electronic modules.

In contrast thereto, the fastening of the second electronic modules is preferably realized exclusively by means of a fixing element on the second leg which can also be configured as a fastening opening for a screwed connection. Valve modules and second electronic modules can in this way be mounted on the basic module independently of each other. It is above all possible to exchange valve modules without having to first remove the second electronic modules arranged thereabove.

The fastening structure is preferably configured such that a valve module can be slipped onto its plug-in location substantially parallel to the fluid connection face in the first leg and perpendicularly to the line-up direction, only with a slight tilting. The space between the mounted valve modules and the mounted second electronic modules should correspondingly allow for this fitting clearance, wherein it is however possible to arrange the second electronic modules practically directly above the valve modules, as a result of which a compact structure and a uniform appearance are obtained.

According to a further aspect of the invention, at least one fastening element for the mounting of the valve assembly, in particular in a switch cabinet is formed in one piece with the basic module, which reduces the manufacturing costs and makes a mounting of the valve assembly more stable.

A first fastening element can be formed by fastening openings in the bottom surface of the first leg which is opposite the fluid connection face.

The valve assembly can be fixed to the bottom of a switch cabinet by means of a first fastening element of this type by being screwed to the bottom of the switch cabinet from the underside of the switch cabinet, for example.

A second fastening element can alternatively or additionally be formed by a groove in the second leg, in particular in the rear side thereof, which extends in the line-up direction and which is configured so as to be plugged onto a supporting rail. The supporting rail, for example a top-hat rail is advantageously fastened to a wall of the switch cabinet such that a mounting on the wall of the switch cabinet is possible by means of the second fastening element. The orientation of the valve assembly remains the same irrespective of the choice of the first or of the second fastening element.

The basic module has a body which is preferably made of an extruded profile. The extruded profile already has for example the basic shape of the first and the second leg and all fluid supply pipes in the first leg and the electrical duct in the second leg and the groove of the second fastening element in the second leg. The fastening structure having the inclined surface(s) for the generation of the pressure force for the valve modules can also already be provided in the extruded profile. The body may substantially be composed of the first and the second leg.

Preferably, all required geometries which can be formed as continuous structure in the line-up direction can generally already be realized in the extruded profile.

The openings which cannot be manufactured by extrusion and the fluid connections on the fluid connection face, the fastening openings for the functional modules, the branch ducts to the fluid ducts and to the bottom surface, fastening openings and openings for the electrical connections in the electrical ducts are then formed for the completion of the basic module. With the exception of the electrical connecting means, it is normally not necessary to mount further components on the body of the basic module. The entire valve assembly can in particular do without hose couplings within the valve assembly.

The invention is described in more detail below on the basis of an example embodiment with reference to the accompanying drawings. In the drawings.

Generally, for reasons of clarity, only few of the components that are present several times are provided with reference numbers.

Figure 1:
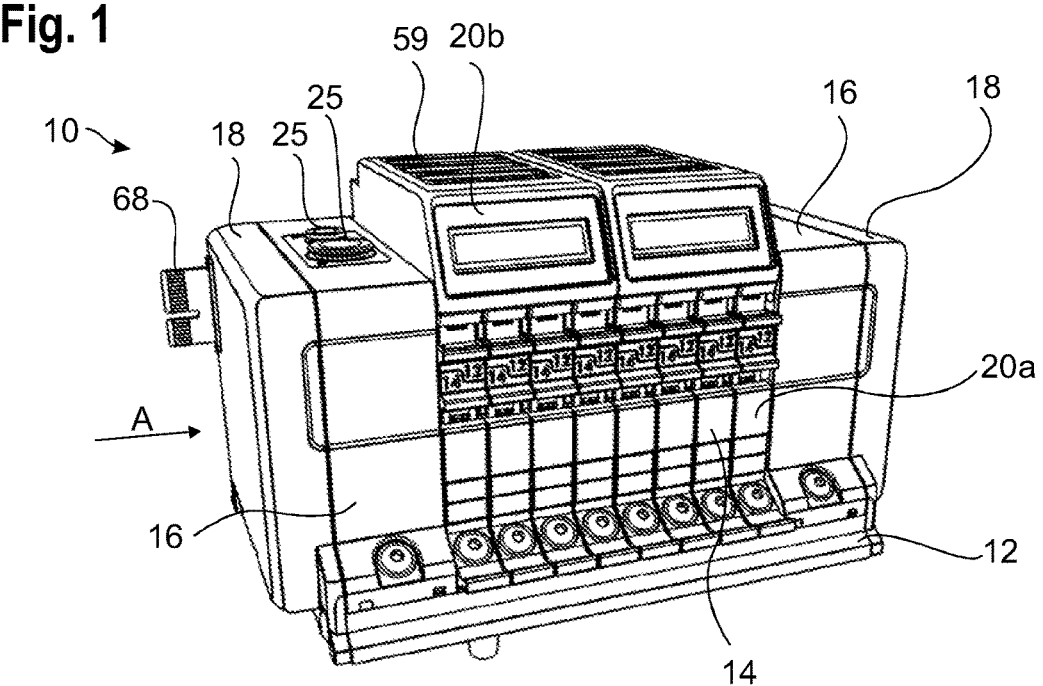
FIGS. 1 and 2 show schematic perspective views of a valve assembly according to the invention.
Figure 2:
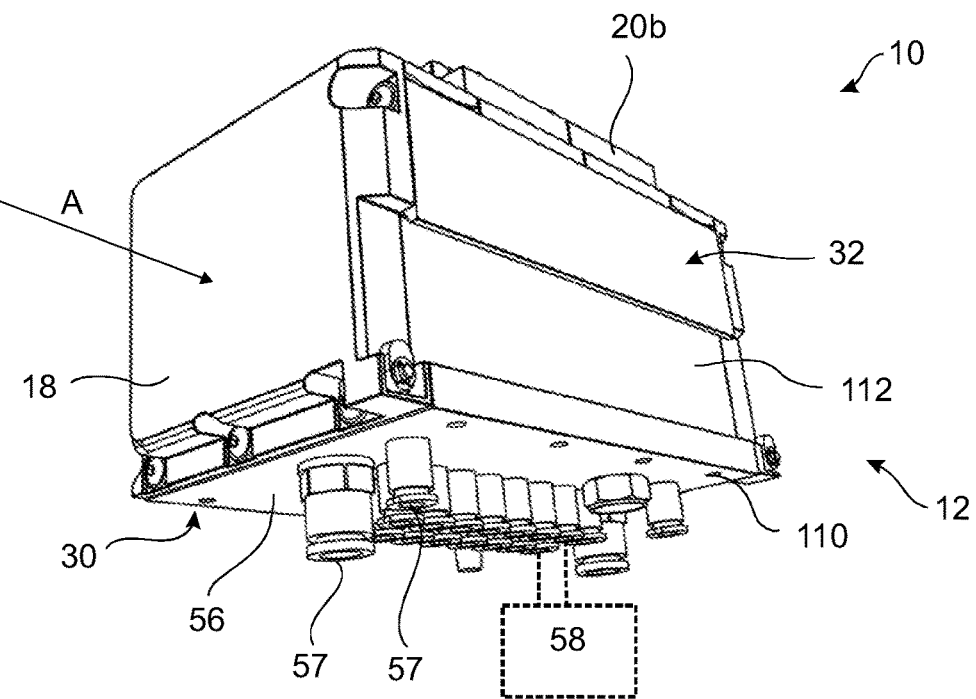
Figure 3:
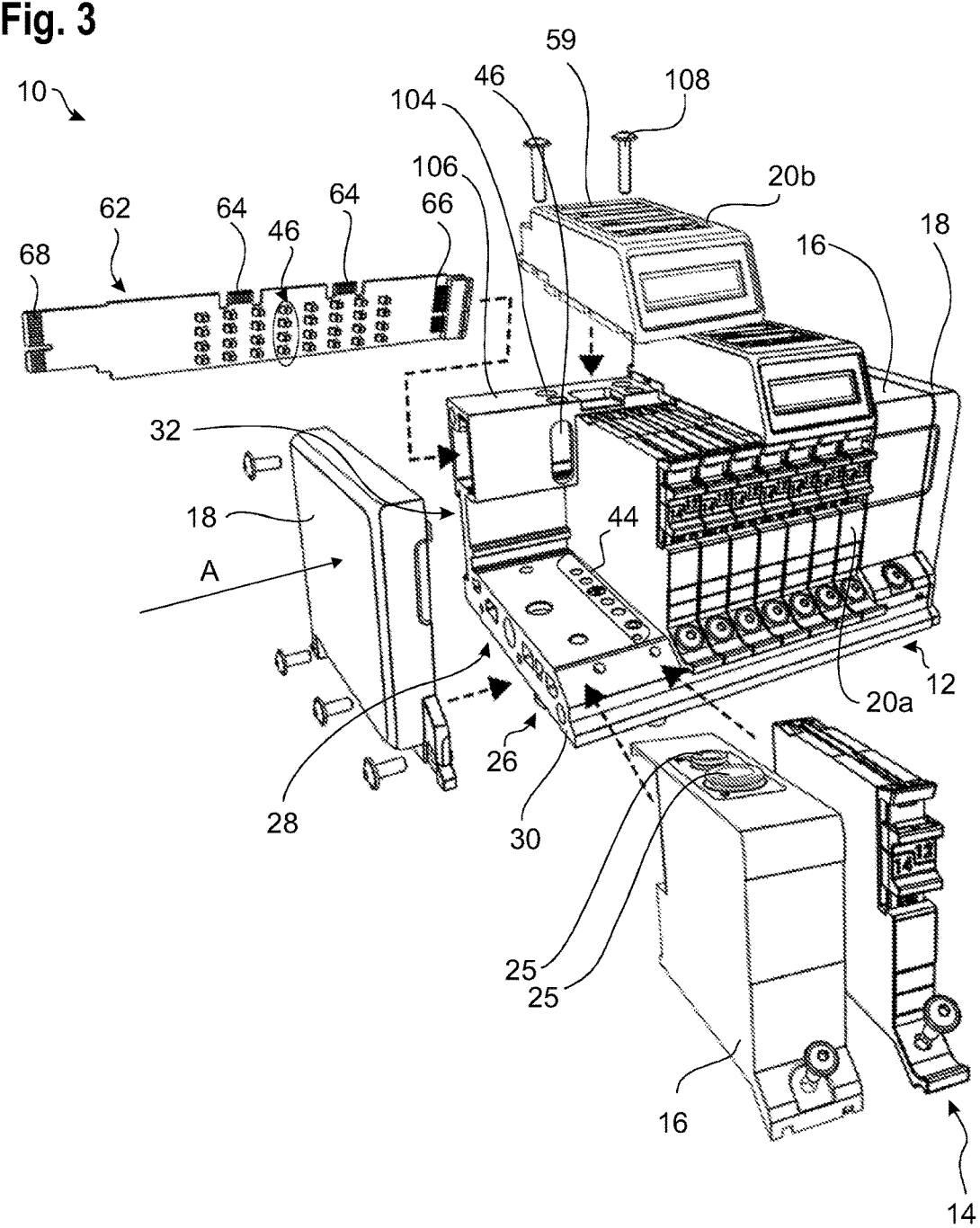
FIG. 3 shows the valve assembly of FIG. 1 in an exploded view.

FIGS. 1 to 3 show a valve assembly 10 having a basic module 12 and a plurality of separate valve modules 14 which are adapted to be mounted on the basic module 12 side by side along a line-up direction A.

The valve assembly 10 for example serves to combine a process control or fluid distribution requiring a plurality of valves in a space-saving manner and to permit a flexible arrangement of valve modules that is adapted to the respective purpose of use in a kind of modular construction system.

In this example, the same basic module 12 is always provided, whereas the kind and number of the mounted valve modules 14 may vary.

The valve modules 14 are here associated with a group of so-called functional modules to which feed-in modules 16, closure modules 18 and electronic modules 20a, 20b also belong in the present example (see FIG. 3).

Valve modules 14 principally comprise at least one valve. The valve modules 14 shown here each comprise a pilot valve 22 which is piloted electrically and works for example pneumatically (here an electrofluidic solenoid valve) and a main valve 24 which is usually configured as a sliding valve (see FIG. 7).

The feed-in module(s) 16 generally permit(s) an introduction or discharge of work, control or process fluids into the basic module 12 via supply connections 25, for example. The feed-in modules 16 may be configured without valves. It is for example possible to provide electrical components such as sensors or also electrically actuated shutoff valves.

The valve modules 14 and possibly also the feed-in modules 16 are received on defined plug-in locations on the basic module 12, a number of plug-in locations being provided in the line-up direction A side by side along the basic module 12.

In the example shown here, two closure modules 18 are furthermore provided which are fitted on opposite sides on one respective lateral face 26 of the basic module 12 to close and seal fluid supply ducts 28 opening there and described in more detail below with respect to the environment.

One respective closure module 18 could also be combined with one respective feed-in module 16 so that they are fitted to the lateral face 26 of the basic module 12 as a unit and simultaneously close the basic module 12 to the outside and permit the feeding-in and discharge of fluids into and out of the basic module 12.

In this example, several types of electronic modules 20a, 20b are provided which in the present example have no fluidic elements but only purely electrical and/or electronic components.

This includes first electronic modules 20a which are for example designed for the control of external electrical drives or as diagnostic modules for the status determination of components of the valve assembly 10. The first electronic modules 20a are arranged in a row with the supply modules 16 or valve modules 14 and can adjoin them in the line-up direction A.

Second electronic modules 20b are furthermore provided and comprise here display means and/or operating elements and electrical connections for the coupling to individual valve modules 14 (not shown), sensor inlets and/or connections for the electrical coupling with further components. The second electronic modules 20b can in this way for example display status messages, measured values and other parameters of the valve assembly 10 and/or transmit control commands to individual valve modules 14. The second electronic modules 20b are here arranged above the plug-in locations for the valve modules 14 as will be explained in more detail below.

It is of course also possible to provide only one or several first electronic modules 20a, only one or several second electronic modules 20b or, if necessary, no electronic modules at all in the valve assembly 10.

It is also possible to mount further functional modules which are not shown here and for example have a sensor system on the basic module 12 in the valve assembly 10.

The basic module 12 has a body which is in particular made of a metallic material such as aluminum or an appropriate plastic material and which is substantially composed of a first leg 30 and a second leg 32 (see for example FIGS. 3 and 4) which are here oriented at an angle of 90° with respect to each other. In a sectional view, the basic module 12 is approximately L-shaped (see for example FIG. 6). The angle between the two legs 30, 32 could also differ from a right angle.

The first leg 30 defines a fluid area 34, and the second leg 32 defines an electrical area 36. The entire supply of the valve assembly 10 with fluid is realized via the first leg 30, whereas the entire electrical supply is realized via the second leg 32 such that the electrical and fluidic supply are spatially completely separated.

A receiving space 38 for the valve modules 14 is formed between the fluid area 34 and the electrical area 36 and is thus delimited on two sides by the two legs 30, 32.

The fluid area 34 has a plane fluid connection face 40 into which a plurality of individual fluid connections 42 is formed.

The valve modules 14 are arranged in the receiving space 38 side by side along a line-up direction A, the line-up direction A extending parallel to the two legs 30, 32.

Perpendicularly to the line-up direction A, all fluid connections 42 of the fluid connection face 40 arranged in a row one behind the other are respectively combined to a fluid interface 44 for one respective valve module 14. The arrangement of the fluid connections 42 could of course also be chosen differently such that a fluid interface 44 can for example also include several fluid connections 42 which are arranged side by side in the line-up direction A.

The fluid interfaces 44 each belong to one of the predetermined plug-in locations for one of the valve modules 14.

Figure 4:
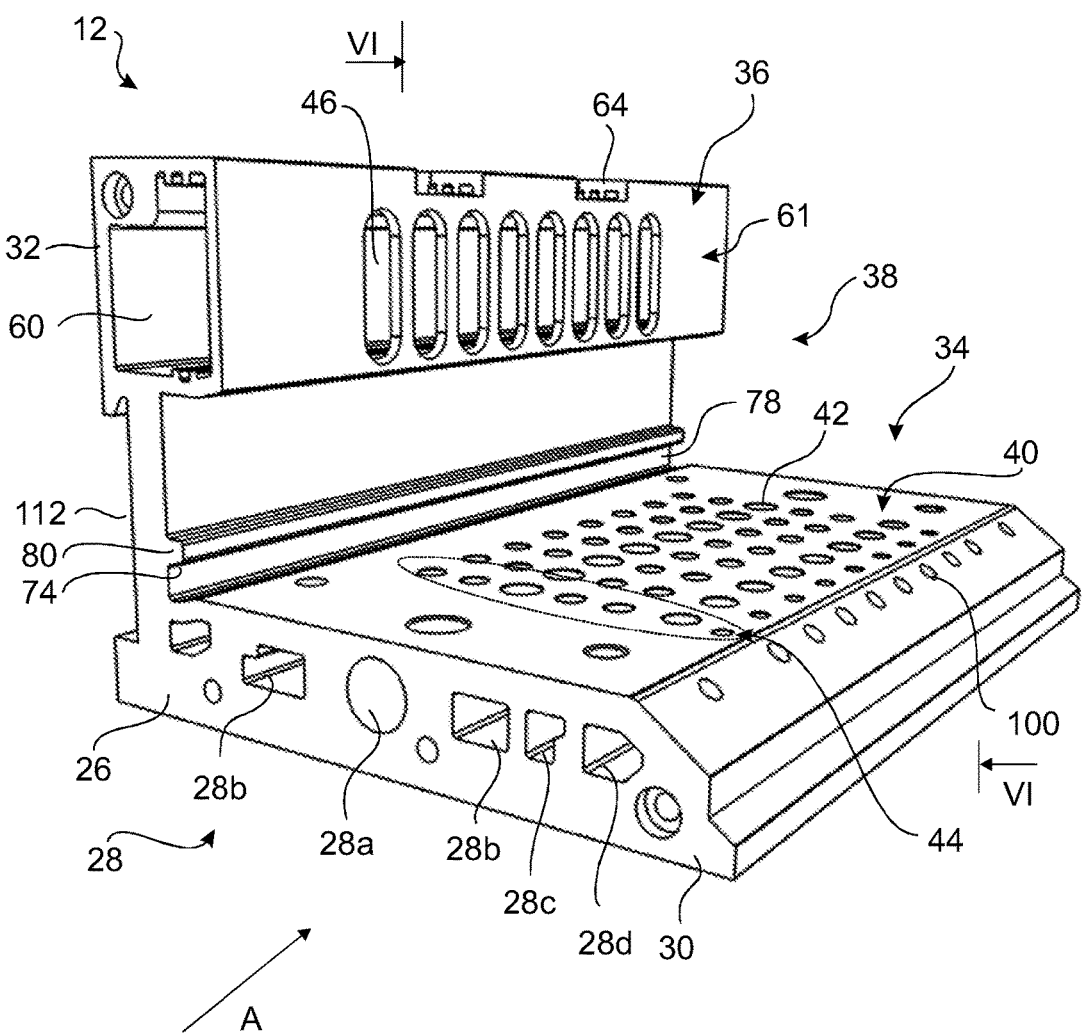
FIGS. 4 and 5 show schematic perspective views of a basic module of the valve assembly of FIG. 1.
Figure 5:
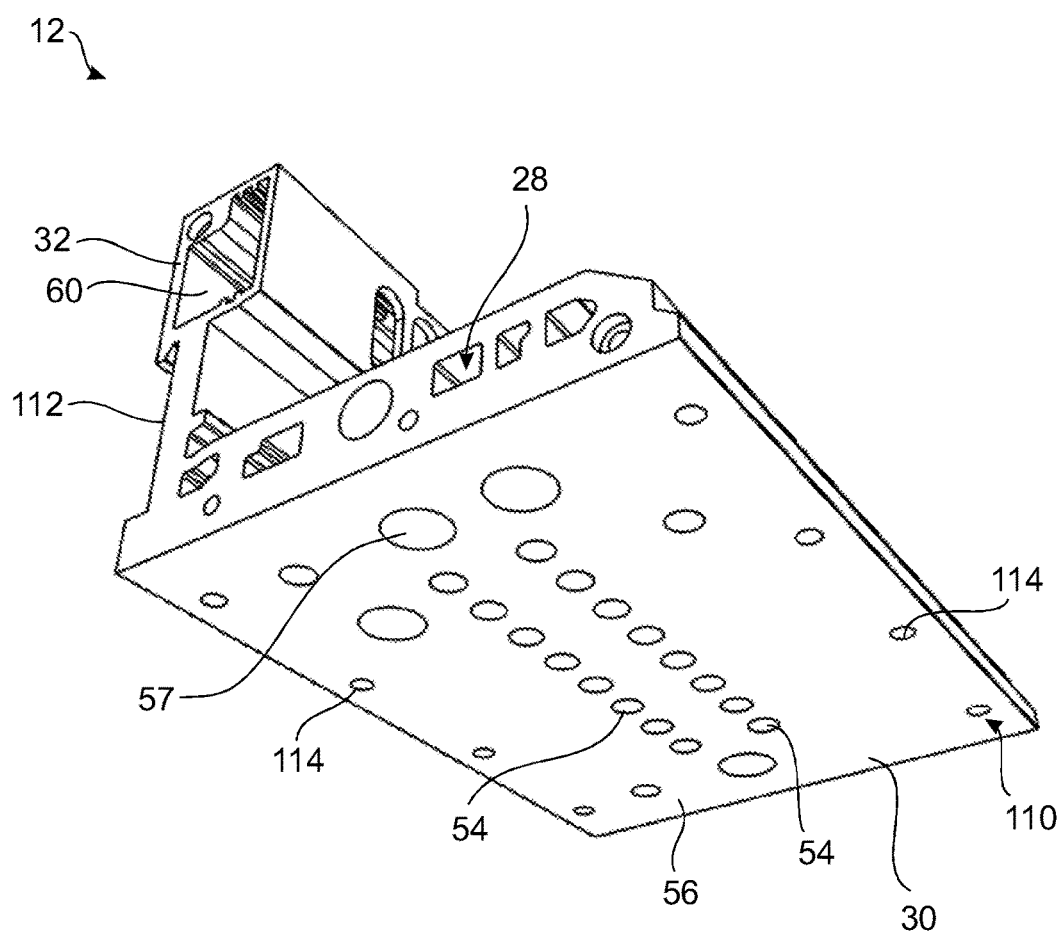

A plug-in location also includes an associated in most cases multipolar electrical connection 46 in the electrical area 36 which forms an electrical interface and comprises a group of connection possibilities for current supply and data lines that are arranged in close vicinity with respect to each other. The electrical connections 46 are all located one behind the other in the line-up direction. The fluid interface 44 and the electrical interface are arranged in the same sectional plane as the line-up direction A, as can be seen in FIGS. 3 and 4, for example.

Since the fluid area 34 and the electrical area 36 are spatially separated from each other, this also applies to the fluid interface 44 and the electrical connection 46.

Upon insertion onto the associated plug-in location, the respective valve module 14 automatically contacts all fluid connections 42 of the respective fluid interface 44 on the fluid connection face 40 and all associated electrical contacts in the electrical connection 46. A further coupling of fluidic or electrical lines is unnecessary.

The slipping of the valve modules 14 onto the respective plug-in location is realized perpendicularly to the line-up direction A and parallel to the first leg 30.

Here, the individual valve modules 14 have a cuboid shape, the narrowest sides of the cuboid lying along the line-up direction A, and the lateral faces oriented perpendicularly to the line-up direction A being configured approximately square.

Figure 7:
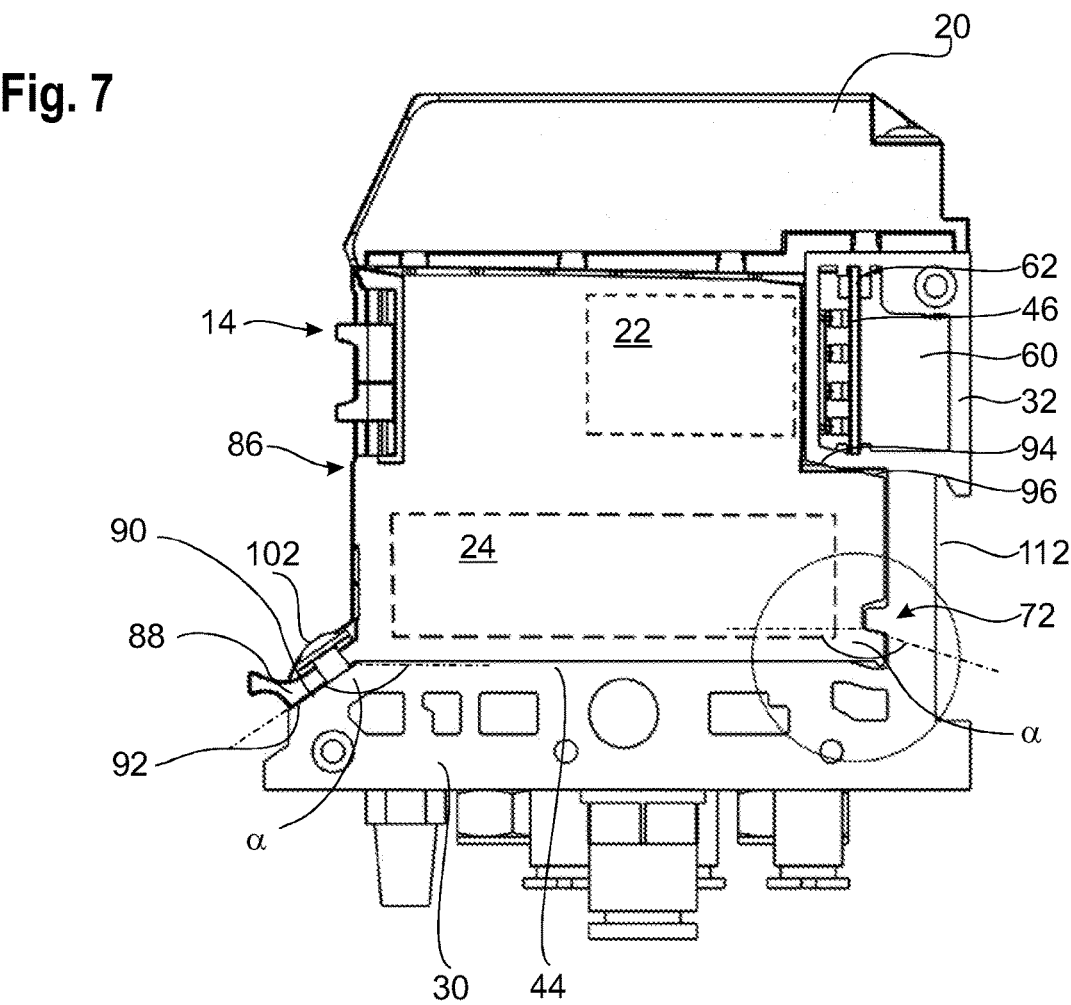
FIG. 7 shows a schematic sectional view of the valve assembly of FIG. 1.

The pilot valve 22 and the main valve 24 of a valve module 14 are here arranged such that the main valve 24 (in the mounted state as respectively shown in the figures) is arranged at the bottom, i.e. in close vicinity to the fluid interface 44, whereas the pilot valve 22 which also requires electrical connections is arranged in close vicinity to the electrical connection 46 (FIG. 7). With respect to the line-up direction A, the pilot valve 22 and the main valve 24 are therefore arranged substantially one on top of the other rather than side by side. The pilot valve 22 of course also has internally a coupling to the fluid connections 42 of the fluid interface 44 to permit a supply with work fluid, for example compressed air, for a piloting.

The body of the basic module 12 is here entirely manufactured from a single extruded profile.

A plurality of fluid supply ducts 28 which can each be associated with different fluids and different functions extend along the line-up direction A in the first leg 30. In this example, all fluid supply ducts 28 entirely extend through the first leg 30 from one lateral face 26 up to the opposite lateral face 26. They are for example formed along with the extruded profile during the manufacture thereof.

The fluid supply ducts 28 can for example comprise a compressed-air supply duct 28a and one or two exhaust-air ducts 28b on both sides of the compressed-air supply duct 28a which are fluidically coupled with the main valves 24, for example. Furthermore, a control compressed-air duct 28c and a control exhaust-air duct 28d are for example provided and are adapted to be coupled with the pilot valve 22 in order to supply compressed-air as control fluid for the pilot valve 22. In this example, the only fluid which is used is compressed-air, and the function of the valve arrangement is substantially the controlled distribution of compressed air.

The number and the occupation of the individual fluid supply ducts 28 however remain up to the person skilled in the art. It would for example also be conceivable to use a hydraulic liquid rather than compressed air or to also provide fluid supply ducts 28 for process and rinsing fluids in addition to control fluid ducts.

Figure 6:
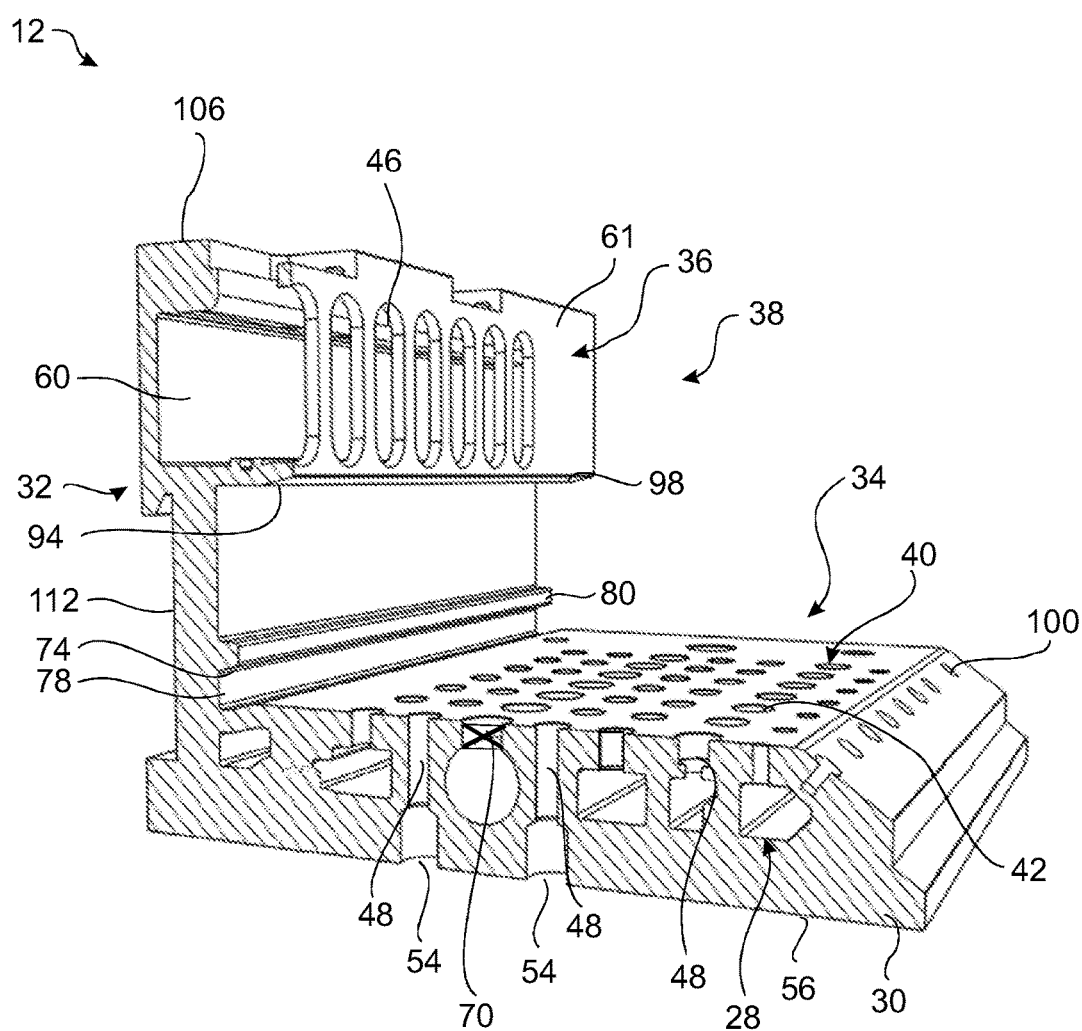
FIG. 6 shows a schematic partially perspective sectional view of the basic module of FIG. 4 along the line VI-VI.

Some of the fluid connections 42 are coupled with the fluid supply ducts 28 which extend parallel to the line-up direction A via branch ducts 48 which lead perpendicularly to the fluid connection face 40 into the interior of the leg 30 (see FIG. 6).

Others of the fluid connections 42 are coupled with one respective fluid connection 54 on a bottom surface 56 of the basic module 12 via branch ducts 48 which constitute passage openings through the complete material thickness of the leg 30. The bottom surface 56 forms the side of the leg 30 which is opposite the fluid connection face 40 and is oriented parallel to the fluid connection face 40.

Each of the fluid connections 42 of the fluid connection face 40 is thus coupled either with a fluid supply duct 28 or with a fluid connection 54 on the bottom surface 56.

Supply connections 57 are here also provided in the bottom surface 56 and permit alternatively or in addition to the supply connections 25 of the supply modules 16 the introduction and/or discharge of work or process fluids into the basic module 12.

In this example, all fluid connections 54 on the bottom surface 56 are provided for the coupling with external actuators 58 (indicated in FIG. 2) which are piloted via the valve modules 14 in that the fluid supply thereof is controlled by the valve modules 14. The external actuators 58 are completely supplied with control fluid, compressed air, for example via the fluid connections 42

The external actuators 58 are here adapted to communicate with electronic connections 59 on the second electronic modules 20b via electrical lines to transmit the position of a spindle of one of the external actuators 58 thereto, for example. The electrical connections 59 may generally be designed as reverting connections.

It would also be conceivable to use fluid connections 54 for discharging a process fluid out of the basic module 12 when the associated valve module 14 is piloted correspondingly.

In this example, the valve modules 14 furthermore have no fluid connections which are not coupled with one of the fluid connections 42 of the fluid interface 44 on the fluid connection face 40.

For an electrical contact, a continuous electrical duct 60 in which an electrical connecting means 62, a printed circuit board in this example, is received is formed in the second leg 32 in the electrical area 36. After the completion of the basic module 12 from the extruded profile, the printed circuit board is inserted into the electrical duct 60 and constitutes the only component which still has to be mounted on the body of the basic module 12 later.

On the side of the second leg 32 turned towards the first leg 30, here in the vicinity of the free end of the second leg 32, an electrical connection face 61 is arranged in which a series of openings to the electrical duct 60 arranged therebehind are formed along the line-up direction A. The individual electrical connections 46 are respectively located in the region of one of the openings and are for example formed by plug sockets inserted into the openings or by contacts directly on the electrical connecting means 62 which are accessible through the openings. The electrical connecting means 62 here has all lines required for the current supply, the data transmission and the communication with external components, the lines being in particular designed in the form of conductive tracks on the printed circuit board.

The electrical connecting means 62 also has the contacts of the electrical connections 46 for the individual valve modules 14 which can also simply be configured as contacts on the printed circuit board in case a printed circuit board is used.

Furthermore, in this example, several electrical electronic module interfaces 64 which are separated from the electrical connections 46 and which serve as an interface for the second electronic modules 20b are additionally formed at the upper edge of the printed circuit board In this example, the electrical connecting means 62 furthermore have a control unit 66 which is also arranged on the printed circuit board and which can be used to output or transmit status messages, for example, or to transmit measuring data transmitted by one of the valve modules 14 to one of the second electronic modules 20b where the data is displayed. However, the control unit 66 can for example also be used to implement incoming control commands for controlling the individual valve modules 14.

The electrical connecting means 62 have at least at one end a single general connecting location 68 in which all separate lines to the individual valve modules 14, the electronic modules 20a, 20b and the control unit 66 for example converge in the form of a plug. The valve arrangement 10 can be coupled with external devices, for example a control and/or a voltage source, via this connection location 68.

The electrical connecting means 62 also permit a communication with a central control of the valve arrangement 10 (not shown).

As shown in FIG. 1, an aperture can be formed in one of the closure modules 18 through which the connection location 68 projects for the coupling with a cable or with further components adapted to be coupled there.

In some or in all branch ducts 48, check valves or shutoff valves 70 can be respectively arranged (see FIG. 6) which are for example configured so as to stop a fluid outflow from the basic module 12 when the corresponding fluid connection 42 of the fluid interface 44 is not occupied by a valve module 14. The check or shutoff valves 70 are then configured so as to be automatically opened when a corresponding valve module 14 is placed onto the plug-in location to which the respective fluid connection 42 belongs. In this case, the respective check or shutoff valve 70 is opened by the valve module 14. This can be realized mechanically or electronically. When the valve module 14 is removed from its plug-in location, the check or shutoff valve 70 automatically closes and thus prevents the exit of fluid or the penetration of dirt into the fluid connections 42.

It is principally possible to provide all fluid connections 42 with such a check or shutoff valve 70. They can however also be provided only in the compressed-air supply duct 28a, e.g.

A fastening structure 72 is provided on the basic module 12 which simplifies the insertion of the valve modules 14 at the respective plug-in location and the fastening of the valve module 14 to the basic module 12. The fastening structure 72 comprises inclined surfaces 74 on the second leg 32 which are adapted to cooperate with inclined surfaces 76 on the rear side of the valve module 14.

The valve modules 14 are inserted into the fastening structure 72, the inclined surfaces 74, 76 sliding against each other and ensuring a pressure force which is oriented in the direction of the fluid connection face 40 and thus presses the fluid connections of the valve modules 14 onto the fluid connections 42.

The inclined surfaces 74 are here formed on a continuous groove 78 in the second leg 32 which can be produced during the extrusion of the extruded profile. The upper edge of the groove 78 can furthermore be configured as a kind of nose 80 which cooperates with an appropriate recess 82 on the rear side of the valve module 14.

Figure 8:
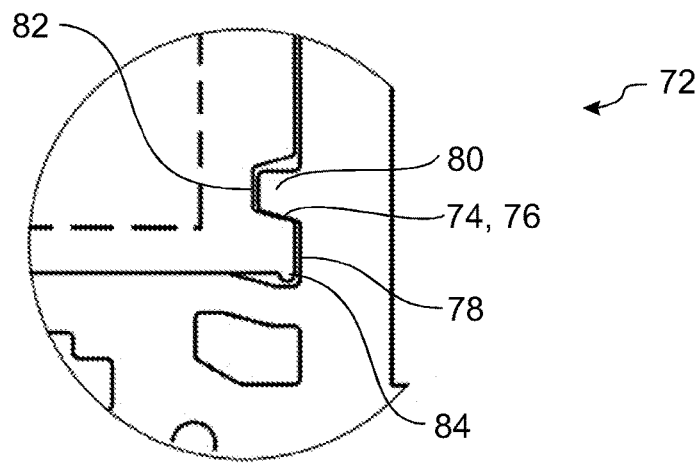
FIG. 8 shows a detail view of a fastening structure for a valve module in an enlarged detail of FIG. 7.

To prevent seals on the fluid connection face 40 or on the underside of the valve module 14 from being damaged upon insertion of the valve module 14 into the basic module 12, a spacer 84 is provided in the form of a projection projecting from the bottom surface of the valve module 14 (see FIGS. 7 and 8) which prevents seals between the fluid connection face 40 and the valve module 14 from being damaged when the valve module 14 is slipped onto its plug-in location. The spacer 84 rests on the fluid connection face 40 upon insertion of the valve module 14 and plunges into the groove 78 which is slightly recessed with respect to the fluid connection face 40 (see FIG. 8) only at the very end of the insertion process. The seals thus come in contact with the fluid connection face 40 only at the very end of the insertion process and can form a fluidic communication between the valve module 14 and the respective fluid connections 42 which is sealed with respect to the environment.

During the end of the inserting process, the inclined surface 74 on the second leg 32 also comes into contact with the complementary inclined surface 76 on the valve module 14 having the same orientation, as a result of which a pressing force is generated in the direction towards the fluid connection face 40.

A projection 88 is formed on the front side 86 on the valve module 14, which has a further inclined surface 90 cooperating with an inclined surface 92 at the free edge of the first leg 30 and resting in a flat manner thereon when the valve module 14 is completely inserted into its plug-in location. The inclined surfaces 90, 92 are inclined with respect to the fluid connection face 40, in the present example at an angle α of an amount of about 135° to 160°. With regard to the amount, the inclined surfaces 74, 76 along with the fluid connection face 40 form approximately the same angle α.

In addition, a further inclined surface 94 can be provided on the second leg 32 which cooperates with an inclined surface 96 having the same orientation on the rear side of the valve module 14 and which is oriented substantially parallel to the inclined surface 74. The inclined surface 94 is formed on an underside 98 of the electrical duct 60. The electrical duct 60 partly projects from the part of the second leg 32 which is directly adjoining in the direction towards the first leg 30. In this region, the valve module 14 is slightly recessed so as to adapt the shape of the second leg 32.

It would also be possible to provide only the inclined surface pairs 74, 76 or 94, 96.

Fixing elements 100 in the form of threaded bores are provided on the basic module 12, into which fastening means, for example screws 102 can be inserted which engage through a passage opening in the projection 88 on the front side 86 of the valve modules 14 to firmly couple the respective valve module 14 with the basic module 12 (see FIG. 4, for example). This coupling is closed only when the valve module 14 is completely and correctly inserted into its plug-in location.

To remove the valve module 14, the fixing element 102 is detached and the valve module 14 is withdrawn from its plug-in location. Further steps are not required.

The first electronic modules 20a can be mounted on the basic module 12 in the same way, wherein they respectively use one of the electrical connections 46.

However, the second electronic modules 20b are here exclusively fastened to the second leg 32. To this end, fixing elements 104 here in the form of threaded bores are provided in the upper free edge 106 of the second leg 32, into which fixing elements 108 here in the form of screws which engage through the second electronic modules 20b can be inserted. The second electronic modules 20b are in this way firmly secured to the basic module 12. A second electronic module 20b can extend over several valve modules 14 in the line-up direction A such that larger displays can also be realized. Though the second electronic modules 20b are here arranged above the valve modules 14, they do not rest against them so that the valve modules 14 can be mounted and demounted without having to detach the second electronic modules 20b which are arranged thereabove.

Any of the electronic modules 20b has its own interface which automatically comes into contact with the electronic module interface 64 on the electrical connecting means 62 upon fixing the second electronic modules 20b to the fixing elements 104 and thus establishes the electronic and electrical connection between the electrical connecting means 62 and the second electronic module 20b.

Two different fastening elements 110, 112 are formed on the basic module 12 to fasten the valve assembly 10 in a switch cabinet, for example.

The first fastening element 110 is here composed of a series of fastening openings 114, for example threaded bores in the bottom surface 56 of the first leg 30, fastening openings 114 being provided along a free edge of the leg 30 and along the edge of the leg 30 where it communicates with the second leg 32, i.e. in places in which the fastening opening 114 does not hinder a positioning of the fluid supply ducts 28.

The valve assembly 10 can for example be fixed to the bottom of a switch cabinet (not shown) by means of the first fastening elements 110. One opening is then appropriately formed in the bottom of the switch cabinet, onto which the bottom surface 56 of the basic module 12 is placed such that the fluid connections 54 and optionally present supply connections 57 for the feeding-in or discharge of different fluid into the fluid supply ducts 28 are accessible from the underside of the switch cabinet. The basic module 12 can be fastened to the edge of the opening at the bottom of the switch cabinet from the underside of the switch cabinet.

The second fastening element 112 has here the shape of a groove which extends in the line-up direction A along the rear side of the second leg 32. In cross-section, the groove of the second fastening element 112 is adapted to the shape of a supporting rail, for example a top-hat rail such that the basic module 12 along with all functional modules mounted thereon can for example be slipped onto a supporting rail mounted on a lateral wall of a switch cabinet.

The orientation of the valve assembly 10 remains the same irrespective of the use of the first or of the second fastening element 110, 112.

As mainly described here, compressed air can be used as the only fluid in the valve assembly 10. However, it is alternatively or additionally of course also possible to use other fluids, either as process fluids, control fluids, work fluids or rinsing fluids. The fluid connections 54 on the bottom surface 56 can not only be used for the coupling of external actuators 58, but also for other appropriate purposes.

The invention claimed is:

1. A valve assembly having a basic module and a plurality of valve modules which are mounted on the basic module side by side along a line-up direction, the basic module comprising a first and a second leg which extend at an angle with respect to each other such that the two legs delimit a receiving space for the valve modules on two sides, a fluid area being provided on the first leg which has a fluid connection face formed on an inside of the first leg which is turned towards the second leg and on which fluid connections are provided which communicate with fluid connections of the valve modules, all fluid connections of the valve modules communicating with fluid connections of the fluid connection face, and an electrical area being provided on the second leg, in which electrical connections are provided that communicate with electrical connections of the valve modules.

2. The valve assembly of claim 1 wherein at least one actuator fluid connection for an external actuator is provided on the basic module, a fluid supply of the actuator being entirely controlled via one of the valve modules, and the actuator fluid connection associated with the external actuator communicating with a fluid connection in the fluid connection face which in turn communicates with a fluid connection of the valve module concerned.

3. The valve assembly of claim 2 wherein the at least one actuator fluid connection runs into a bottom surface of the basic module which is formed on the first leg on the side opposite the fluid connection face.

4. The valve assembly of claim 3 wherein all fluid connections are associated with the bottom surface of the basic module.

5. The valve assembly of claim 1 wherein fluid supply ducts which extend parallel to each other along the line-up direction and which guide the fluid through the basic module are formed in the first leg in the fluid area.

6. The valve assembly of claim 5 wherein the fluid connections in the fluid connection face communicate with at least one of the supply ducts or with the bottom surface by means of a respective branch duct.

7. The valve assembly of claim 6 wherein a shutoff or check valve is arranged in at least one of the branch ducts and is configured so as to be adapted to be opened by a valve module mounted on the basic module.

8. The valve assembly of claim 1 wherein the second leg in the electrical area has an electrical duct in which electrical connecting means extend.

9. The valve assembly of claim 8 wherein the electrical connecting means are formed by a printed circuit board which extends in the line-up direction (A) over the entire length of the electrical area.

10. The valve assembly of claim 9 wherein the electrical connections are arranged on the printed circuit board.

11. The valve assembly of claim 9 wherein the second leg has a plurality of openings behind which the electrical connections are arranged such that they are directly accessible through the openings.

12. The valve assembly of claim 11 wherein the electrical connections are plug connectors.

13. The valve assembly of claim 1 wherein in addition to the valve modules, further functional modules are inserted into the basic module.

14. The valve assembly of claim 13 wherein the further functional modules comprise at least one of an electronic module, which has electrical connections but no fluid connections, a feed-in module which includes supply connections for the supply of the basic module with fluidic energy, the supply connections communicating with at least one fluid supply duct of the basic module via at least one fluid connection of the fluid connection face, or a closure module which is arranged on one side of the basic module transversely to the line-up direction.

15. The valve assembly of claim 1 wherein a fastening structure into which the valve modules can be inserted is formed on the basic module, the fastening structure comprising at least one inclined surface which is directed so as to exert a clamping force onto the respective valve module which presses the fluid connections of the valve module against the associated fluid connections of the fluid connection face.

16. The valve assembly of claim 15 wherein a continuous groove is formed in the second leg, on of the inclined surfaces being formed on a nose which delimits the upper side of the groove, the nose being adapted for cooperating which a recess on a rear side of the valve module.

17. The valve assembly of claim 15 wherein an inclined surface is provided on the second leg and cooperates with the inclined surface having the same orientation on the rear side of the valve module and which is oriented substantially parallel to the inclined surface.

18. The valve assembly of claim 17 wherein the inclined surface is formed on an underside of the electrical duct.

19. The valve assembly of claim 1 wherein fixing elements which are arranged in the area of a free end of the first leg are provided on the basic module to fasten the valve modules.

20. The valve assembly of claim 1 wherein at least one fastening element is configured in one piece with the basic module for the mounting of the valve assembly.

21. The valve assembly of claim 20 wherein at least one fastening element is provided, the at least one fastening element being one of a first fastening element formed by fastening openings in the bottom surface of the first leg opposite the fluid connection face or a second fastening element formed by a groove in the second leg which extends in the line-up direction and configured to be put onto a supporting rail.

22. The valve assembly of claim 1 wherein the basic module is made from an extruded profile.

* * * * *